July 12, 1949.  J. H. WOOD  2,476,233
ELECTRIC GUARDGATE FOR STOCK
Filed Oct. 16, 1946

*INVENTOR.*
JOSEPH H. WOOD
BY *Victor J. Evans & Co.*
ATTORNEYS

Patented July 12, 1949

2,476,233

UNITED STATES PATENT OFFICE 2,476,233

ELECTRIC GUARD GATE FOR STOCK

Joseph H. Wood, Ponchatoula, La.

Application October 16, 1946, Serial No. 703,665

1 Claim. (Cl. 256—10)

This invention relates to improvements in devices for keeping stock enclosed, and more particularly to the provision of an electric guard gate for stock.

It is an object of this invention to provide a simple electrified gate which satisfactorily replaces the usual cumbersome and unwieldly gates heretofore employed.

A further object is the provision of an electric gate which can be easily and quickly installed, requiring very little apparatus, and has few parts.

A further object is the provision of an electrified stock guard gate which will after a time keep stock from its vicinity, and which can be easily opened by merely releasing a common hook.

A further object is the provision of an electric stock guard which can be driven through with an automobile or truck without stopping to open or close a gate, but which can be swung open for other purposes when necessary.

Figure 1:
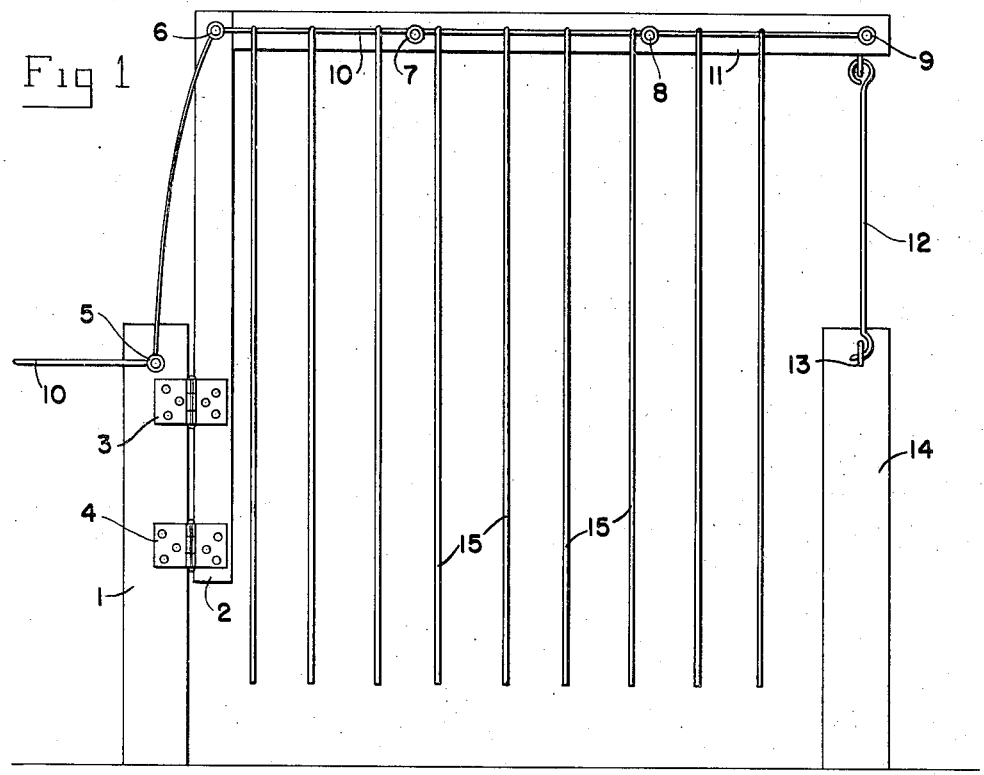

These and other objects are attained by the novel construction and arrangement of parts hereinafter described and illustrated by the accompanying drawings, forming a part hereof, and in which Fig. 1 is a front elevational view of the electrified stock guard gate.

Figure 2:
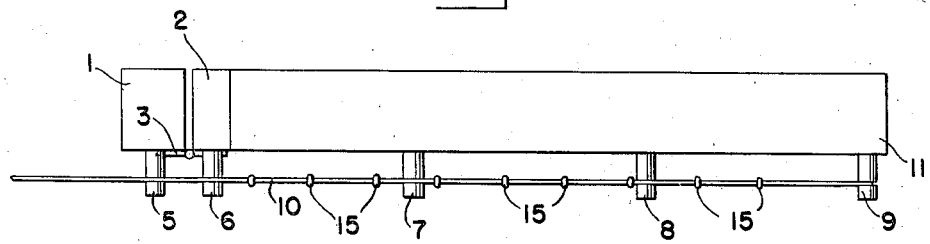

Fig. 2 is a plan view of the gate.

Referring to the drawings, the gate is shown to comprise a post 1, to which a frame 2 is connected by hinges 3 and 4. Mounted on the post 1 is an insulator 5, and on the frame there are insulators 6, 7, 8, 9, an electrified wire 10 being connected to the insulators.

Connected to cross bar 11 of the frame is a hook 12 adapted to be received by an eye 13 on a post 14, to hold the gate closed. The hook can be easily released from the eye when it is desired to open the gate.

Depending from the wire 10 are a plurality of spaced wires 15, which extend almost to but do not touch the ground. The wire 10 is connected to a generator of electric current (not shown), the generator being grounded.

In operation, when stock contact the wires 15, an electric circuit is completed through the stock to the ground, giving the stock a shock which causes it to turn back from the gate.

The device is obviously simple and easily installed, with considerable effectiveness in repelling stock from the gate.

The above description is to be considered as illustrative and not limitative of the invention of which modifications can be made without departing from the spirit and scope of the invention as set forth in the appended claim.

The invention having been described, what is claimed:

In an electrified stock guard gate, the improvement comprising an L-shaped frame having a horizontally disposed crossbar and a straight portion extending from one end of said crossbar at right angles thereto, a plurality of insulators fixed to said crossbar in spaced relation to each other, an electrified wire supported by said insulators and a plurality of free hanging wires fixed at one end and depending from said electrified wire in spaced relation to each other.

JOSEPH H. WOOD.

REFERENCES CITED

The following references are of record in the file of this patent:

UNITED STATES PATENTS

| Number | Name | Date |
|---|---|---|
| 343,939 | Wilson | June 15, 1886 |
| 922,956 | Roberts | May 25, 1909 |
| 993,729 | Steininger | May 30, 1911 |
| 1,634,312 | Zecchino | July 5, 1927 |
| 2,146,229 | Riepl | Feb. 7, 1939 |
| 2,306,661 | Gengler | Dec. 29, 1942 |
| 2,376,630 | Stentz | May 22, 1945 |
| 2,404,687 | Bowser | July 23, 1946 |

FOREIGN PATENTS

| Number | Country | Date |
|---|---|---|
| 173,802 | Germany | July 28, 1906 |